US009779184B2

(12) United States Patent
Winn et al.

(10) Patent No.: US 9,779,184 B2
(45) Date of Patent: Oct. 3, 2017

(54) SCALABLE MULTI-USER CAD SYSTEM AND APPARATUS

(71) Applicant: Brigham Young University, Provo, UT (US)

(72) Inventors: Joshua Winn, Vernon, CT (US);
Timothy A. Bright, Provo, UT (US);
Chia-Chi Teng, Provo, UT (US);
Charles Gregory Jensen, Provo, UT (US)

(73) Assignee: Brigham Young University, Provo, UT (US)

( * ) Notice: Subject to any disclaimer, the term of this patent is extended or adjusted under 35 U.S.C. 154(b) by 631 days.

(21) Appl. No.: 13/837,208

(22) Filed: Mar. 15, 2013

(65) Prior Publication Data
US 2014/0278269 A1 Sep. 18, 2014

(51) Int. Cl.
*G06F 17/50* (2006.01)
*H04L 29/08* (2006.01)
*G06F 9/50* (2006.01)

(52) U.S. Cl.
CPC ............ *G06F 17/50* (2013.01); *G06F 9/5088* (2013.01); *H04L 67/1002* (2013.01); *H04L 67/1008* (2013.01); *H04L 69/329* (2013.01); *G06F 2217/04* (2013.01)

(58) Field of Classification Search
CPC . G06F 17/50; G06F 2217/04; H04L 67/1002; H04L 69/329; G06Q 10/10; G06Q 10/101; G06Q 10/103
See application file for complete search history.

(56) References Cited

U.S. PATENT DOCUMENTS

| 6,341,291 | B1 * | 1/2002 | Bentley | G06F 17/30126 |
| 7,069,192 | B1 * | 6/2006 | Freitag | G06F 17/50 700/182 |
| 7,949,990 | B2 * | 5/2011 | Pfeil | G06F 17/50 715/733 |
| 8,892,404 | B2 * | 11/2014 | Potter | G06F 17/50 703/1 |
| 8,983,801 | B2 * | 3/2015 | Schneider | G06F 17/50 703/1 |
| 2001/0047251 | A1 * | 11/2001 | Kemp | G06F 17/5004 703/1 |
| 2003/0158913 | A1 * | 8/2003 | Agnoli | H04L 29/06 709/219 |
| 2004/0125134 | A1 * | 7/2004 | Ozasa | G06F 17/50 715/751 |
| 2013/0117064 | A1 * | 5/2013 | Sadeghi | G06Q 10/0633 705/7.27 |

* cited by examiner

*Primary Examiner* — Chirag R Patel
(74) *Attorney, Agent, or Firm* — Kunzler Law Group

(57) ABSTRACT

A system for scalable multi-user CAD may include a traffic consolidation server consolidating feature edits from CAD workstations editing one or more proximate regions of an engineering object. The traffic consolidation servers may transmit feature changes to other workstations editing the proximate regions of the engineering object while forwarding the feature changes to a CAD model server. CAD model servers may be configured to receive consolidated feature changes pertaining to an assigned region of the engineering object. An assignment server may balance processing loads on traffic consolidation servers. Methods and apparatus corresponding to the above system are also disclosed herein.

6 Claims, 11 Drawing Sheets

SCALABLE MULTI-USER CAD SYSTEM AND APPARATUS

BACKGROUND OF THE INVENTION

Field of the Invention

The claimed invention relates to computer-aided design (CAD) technologies such as computer-aided drawing, drafting, and modeling in general, and apparatus, systems, and methods for scalable multi-user CAD in particular.

Description of the Related Art

Currently available CAD applications typically require that a single user assume ownership and control of a design or engineering model (e.g. a file or database record) in order to prohibit multiple users from making uncoordinated changes to the model. Furthermore, as the number of collaborative users increases, the server that executes the CAD application and the associated networking infrastructure may be overwhelmed. Consequently, currently available CAD solutions are not scalable to large numbers of concurrent users.

BRIEF SUMMARY OF THE INVENTION

The present invention has been developed in response to the present state of the art, and in particular, in response to the problems and needs in the art that have not yet been fully solved by currently available multi-user CAD systems, apparatus, and methods. Accordingly, the claimed inventions have been developed to provide a scalable multi-user CAD apparatus, method, and system that overcome shortcomings in the art.

As detailed herein, a system for scalable multi-user CAD may include a plurality of CAD workstations that render a local model of an engineering object on a display, receive edits to the local model from a user corresponding to feature changes, and transmit the feature changes to a traffic consolidation server assigned to the CAD workstation. Traffic consolidation servers may be configured to receive feature changes from a group of workstations editing assigned regions of the engineering object that are proximate to one another.

The traffic consolidation servers may transmit feature changes to other workstations editing the proximate regions of the engineering object while forwarding the feature changes to a CAD model server. The CAD model server may receive consolidated feature changes and apply them to a global CAD model of the engineering object managed by a storage server. CAD model servers may likewise be configured to receive consolidated feature changes pertaining to an assigned region of the engineering object.

The system for scalable multi-user CAD may further include an assignment server that balances the communication and processing loads on traffic consolidation servers by assigning one or more editing regions of the engineering object to separate traffic consolidation servers, monitoring the communication and processing loads on the traffic consolidation servers, and reassigning workstations to traffic consolidation servers as required to rebalance the processing and communication loads.

Another system for scalable multi-user CAD may include CAD workstations configured to render geometry definitions corresponding to a viewed portion of a global CAD model, the geometry definitions generated by the CAD model server and transmitted to the CAD workstations via the traffic consolidation servers.

Apparatus and methods corresponding to the above systems are also disclosed herein, as well as illustrative depictions of various aspects of the claimed invention.

It should be noted that references throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

The described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1A:
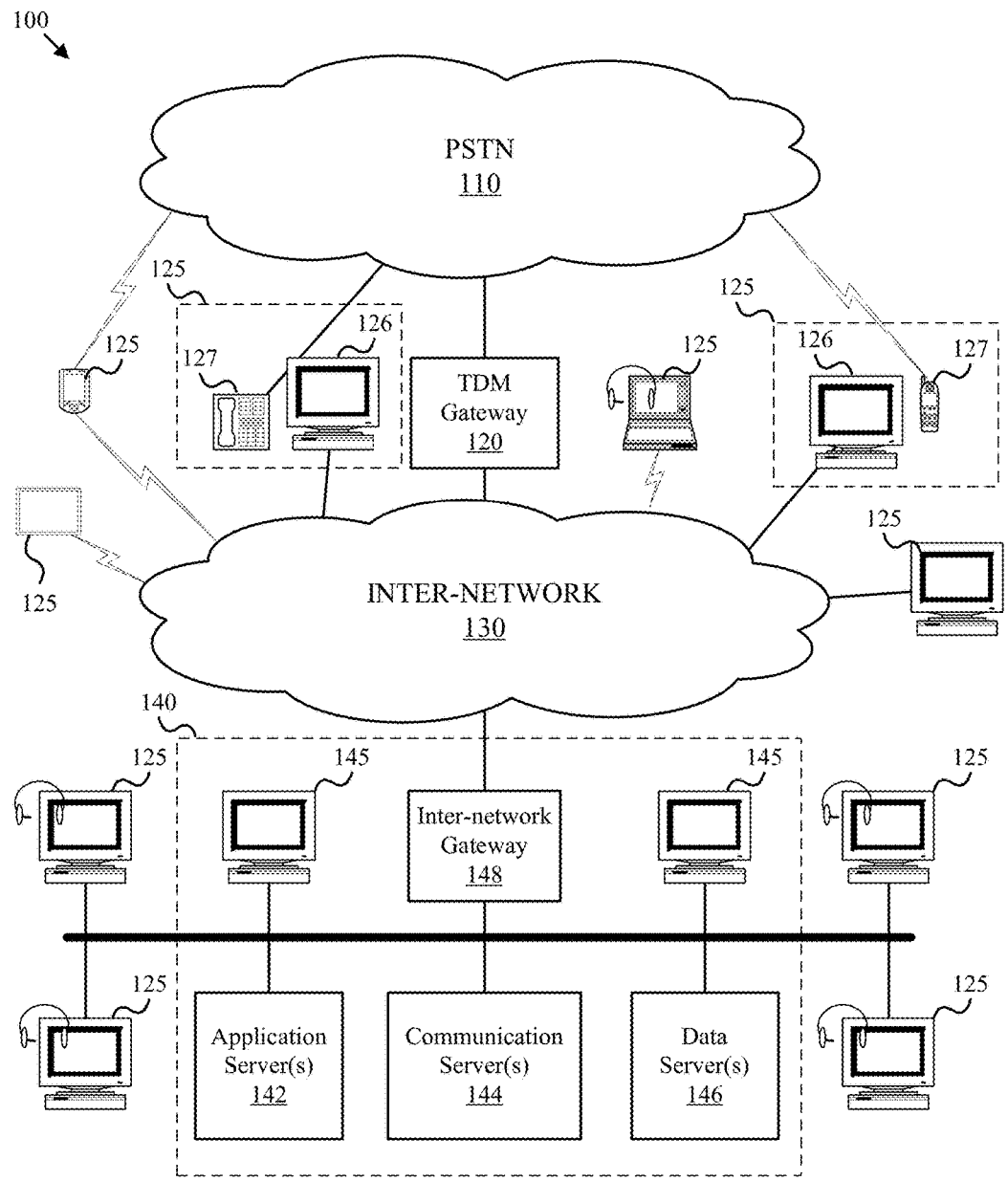
FIG. 1a is a block diagram of one example of a computing and communications infrastructure that is consistent with one or more embodiments of the claimed invention.

Some of the functional units described in this specification have been labeled as modules, in order to more particularly emphasize their implementation independence. Others are assumed to be modules. For example, a module or similar unit of functionality may be implemented as a hardware circuit comprising custom VLSI circuits or gate arrays, off-the-shelf semiconductors such as logic chips, transistors, or other discrete components. A module may also be implemented with programmable hardware devices such as field programmable gate arrays, programmable array logic, programmable logic devices or the like.

A module or a set of modules may also be implemented (in whole or in part) as a processor configured with software to perform the specified functionality. An identified module may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module. A module may also be embodied as a server with a service executing thereon.

Indeed, the executable code of a module may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any tangible form capable of enabling execution of a program of machine-readable instructions on a digital processing apparatus. For example, a computer readable medium may be embodied by a flash drive, compact disk, digital-video disk, a magnetic tape, a Bernoulli drive, a magnetic disk, a punch card, flash memory, integrated circuits, or other digital processing apparatus memory device. A digital processing apparatus such as a computer may store program codes, associated data, and the like on the computer readable medium that when retrieved enable the digital processing apparatus to execute the functionality specified by the modules.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

As used herein the term 'CAD' or 'computer-aided design' refers to the use of computer systems to assist in the creation, modification, analysis, or optimization of a design. CAD tools include, but are not limited to drafting, drawing, and modeling tools; visualization tools; and analysis tools. As such, applications such as simulation tools and manufacture planning tools are incorporated (i.e. layered) into a CAD system, distinctions between computer-aided design, computer-aided engineering, computer-aided manufacturing, and computer simulation become less relevant. Therefore, the term 'multi-user CAD' as used herein may apply to a range of collaborative applications.

This description also refers to various units of editing, analysis and storage such as parts, regions, geometries, elements and features. As used herein, the term 'feature' is assumed to be an attribute, metric or the like that is the lowest level/unit of user accessible representation (i.e. editing) of a CAD model. Therefore all other units of editing and storage encompass one or more features.

FIG. 1a is a block diagram of one example of a computing and communications infrastructure 100 that is consistent with one or more embodiments of the claimed invention. As depicted, the infrastructure 100 includes various systems, subsystems, and networks such as a public switched telephone network (PSTN) 110, a TDM gateway 120 connecting the PSTN to an inter-network 130, a variety of workstations 125, a data center 140 with administrative terminals 145, an inter-network gateway 148 connecting a local area network to the inter-network 130, and various servers such as application servers 142, communication servers 144, and data servers 146. The infrastructure 100 is one example of components that can be operably interconnected to provide an infrastructure for a scalable multi-user CAD system.

Each workstation 125 may include a separate computing device 126 and a communications device 127 or the computing device and communications device may integrated into the workstation 125. The computing devices 126 may enable graphical editing and viewing of CAD models. The communications devices 127 may enable users to communicate with other users that are concurrently editing a CAD model.

The inter-network 130 may facilitate electronic communications between the various workstations and servers. In one embodiment, the inter-network 130 is the internet. In another embodiment, the inter-network 130 is a virtual private network (VPN).

Various servers such as blade servers within the data center 140 function cooperatively to facilitate concurrent collaborative editing of CAD models by local and remote users. For example, the application servers 142 may provide one or more CAD applications to the local and remote users. Some users may have a portion of the CAD applications installed on their local computing devices 126.

The communication servers 144 may facilitate communications between the users through various channels or services such as VOIP services, email services, instant messaging services, short message services, and text messaging services. The workstations 125 may leverage such services for user to user communications via the communication servers 144 or via other available service platforms.

The data servers 146 or the like may store CAD models of design or engineering objects within various model files or records. The data servers may replicate copies of the models for use by various users. Some users may have a local copy of a model. As described herein, instead of requiring a particular user to assume control of a model file or record, updates to the model may be coordinated by one or more multi-user CAD applications including client versions, server versions, and cloud versions of such applications.

Figure 1B:
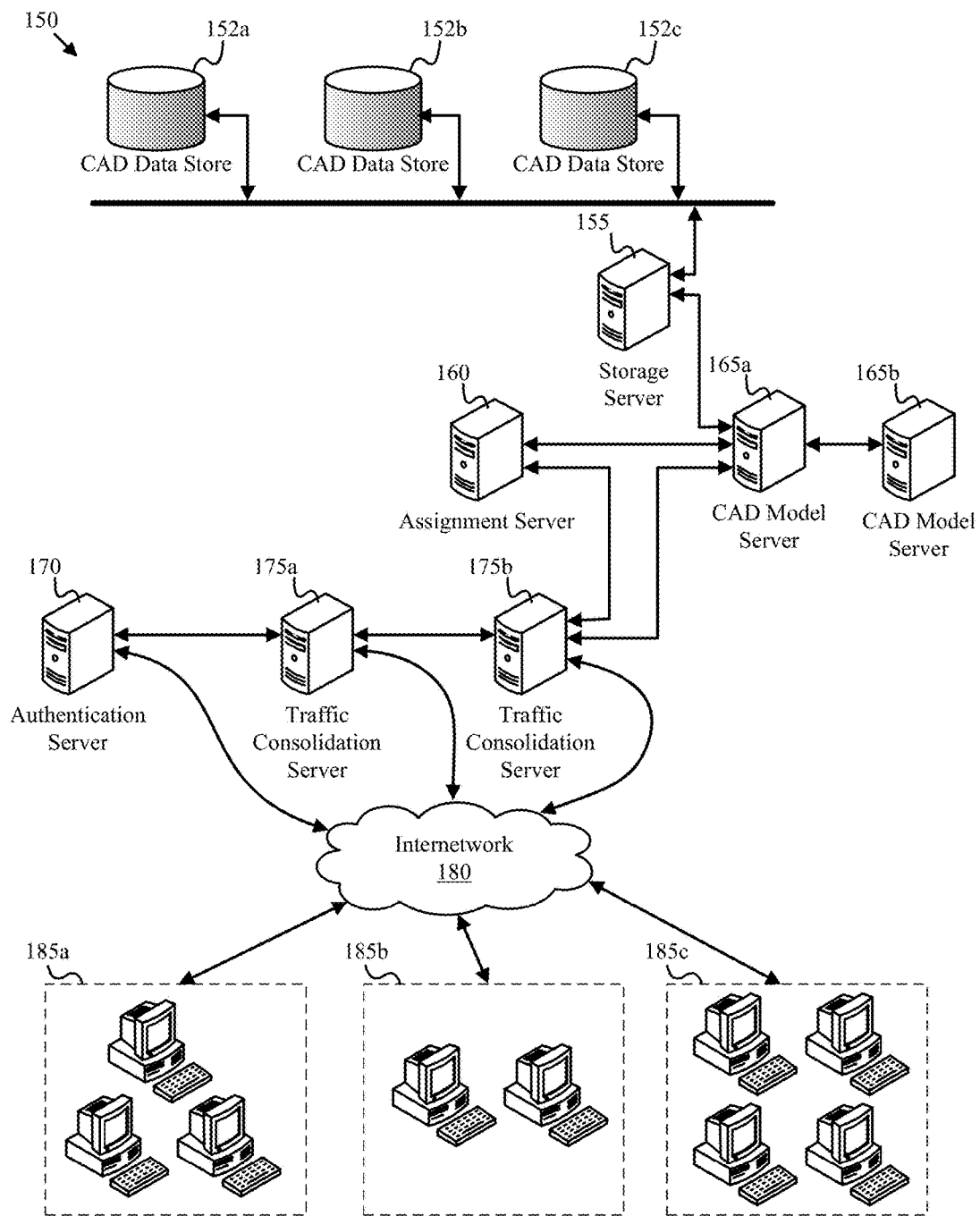
FIG. 1b is a block diagram of one example of a multi-user CAD system that is consistent with one or more embodiments of the claimed invention.

FIG. 1b is a block diagram of one example of a multi-user CAD system 150 that is consistent with one or more embodiments of the claimed invention. As depicted, the multi-user CAD system 150 includes a CAD data store 152, a storage server 155, an assignment server 160, a CAD model server 165, an authentication server 170, one or more traffic consolidation servers 175, an internetwork 180, and a plurality of workstations 185. The multi-user CAD system 150 facilitates scaling collaborate design projects to large numbers of designers while maintaining access control to CAD data and balancing communication and processing loads between servers.

The CAD data store 152 stores and retrieves files or other units of data such as database records that correspond to a CAD model of an engineering object. As depicted, the CAD data store 152 may be partitioned between multiple storage devices, managed by a storage server 155. In one embodiment, the CAD data store is a disk array mounted on the storage server 155. In other embodiments, the CAD data store 152 may include various configurations of network-attached storage (NAS) or storage area networks (SANs).

The CAD model server 165 controls user access to data managed by the CAD data store 152. Controlling user access to CAD data may include partitioning an engineering object into one or more editing regions. The partitioning may be automatic, for example when the engineering object is opened for editing, or user driven, for example in response to a user selecting a region or particular geometries, elements or features for editing. In one embodiment, the CAD model server 165 ensures that users can only access data that corresponds to geometries, elements, and features within an editing region assigned to that user. In another embodiment, any user may change a feature as long as that feature or region has not been assigned to another user. As depicted, the CAD model server 165 may be partitioned across multiple computing devices. Each CAD model server 165 may control access to specific editing regions representing separate parts of an engineering object.

In addition to blocking users from editing parts, regions, geometries, elements or features not assigned to them, the CAD model server 165 may also block an update to a CAD model if the changes to an editable feature violate engineering constraints associated with the modeled engineering object.

The traffic consolidation server 175 consolidates feature changes made by one or more users into feature changes to be applied to the engineering object as storage change transactions, such as database transactions. As depicted, traffic consolidation may be distributed across multiple servers 175. In one embodiment, each traffic consolidation server 175 consolidates feature changes provided by the workstations 185 assigned to the traffic consolidation server 175.

The assignment server 160 manages storage, processing, and communication loads among the servers comprising the multi-user CAD system 150. For example, the assignment server 160 may assign groups of workstations 185 to specific traffic consolidation servers 175. Users editing assigned parts, regions, geometries, elements or features of an engineering object that are proximate to each other may be assigned to a single traffic consolidation server 175 to facilitate localization of communications traffic.

The assignment server 160 may monitor storage, processing, and communication loads among the various servers in the multi-user CAD system 150 and modify assignments of workstations 185 to traffic consolidation servers 175, assignments of traffic consolidation servers 175 to CAD model servers 165, or editing and viewing regions of the engineering object to specific CAD model servers 165 to optimize system performance.

The authentication server 170 verifies the identity of users operating workstations 185 and permits access to the multi-user CAD system 150 to authenticated users. The internetwork 180 may be the public internet or a network accessible to users not involved in designing the engineering object, so the authentication server 170 ensures that only authorized users gain access to the multi-user CAD system 150.

Figure 2:
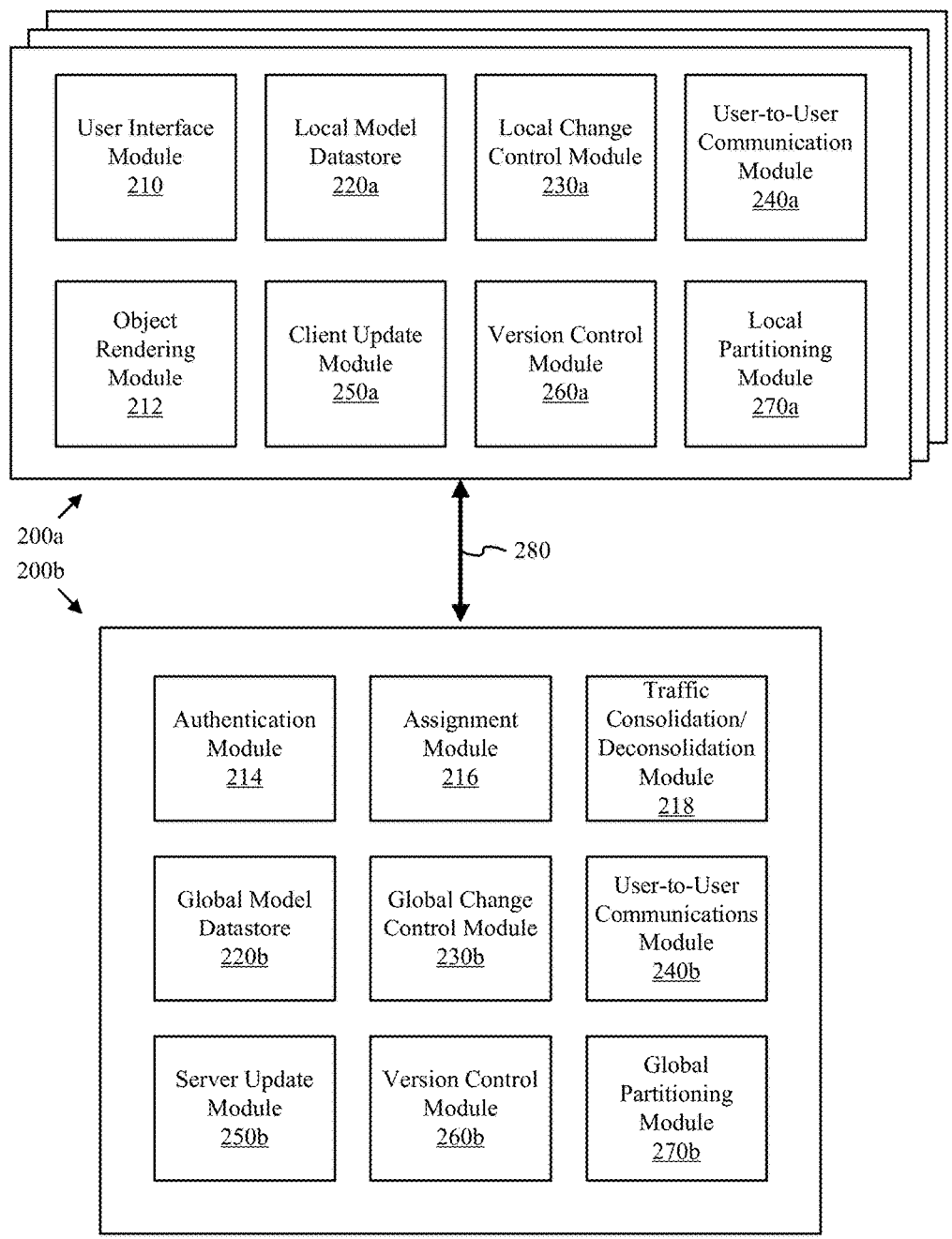
FIG. 2 is a block diagram of one example of a multi-user CAD apparatus that is consistent with one or more embodiments of the claimed invention.

FIG. 2 is a block diagram of one example of a multi-user CAD apparatus 200 that is consistent with one or more embodiments of the claimed invention. As depicted, the multi-user CAD apparatus 200 includes a variety of modules including a user interface module 210, an object rendering module 212, an authentication module 214, an assignment module 216, a traffic consolidation/deconsolidation module 218, a model datastore 220, a change control module 230, a user-to-user communication module 240, an update module 250, a version control module 260, and a partitioning module 270.

Each of the modules may reside on a single computing device (i.e. node) or be collaboratively partitioned onto multiple devices or nodes. For example, the depicted embodiment includes a client node 200a where the various partitioned modules are appended with the reference letter 'a' and a server node 200b where the partitioned modules are appended with the reference letter 'b'. The modules may be primarily or wholly comprised of software codes and associated data that are executed and processed by a digital processing apparatus such as a computer or server to provide the specified functionality.

The user interface module 210 may provide a user with a variety of interface elements that facilitate concurrent collaborative editing. Examples of such interface elements include interfaces elements for displaying a feature tree, defining a partitioning surface or equation, selecting, reserving, assigning, locking and releasing geometries, editing regions and features, specifying a feature constraint, selecting and editing geometries, displaying a list of concurrent users, displaying user identifiers proximate to assigned editing regions, presenting a list of geometries and/or features, prioritizing user access rights and priorities (e.g. by an administrator), selecting user-to-user communication channels, initiating communication with another user, and providing access to software tools corresponding to various stages or layers associated with an engineering object. The user interface module 210 may also respond to mouse events, keyboard events, and the like.

The object rendering module 212 renders the engineering object on a display for viewing by the user. The user interface module 210 may overlay interface elements such as control points on the rendered engineering object.

The model datastore 220 stores data for the node(s) 200. The model datastore 220 may include an actual storage device or act as an interface to a storage device. In particular, the model datastore 220 may enable the nodes 200 to store and retrieve files or other units of data such as database records that correspond to an electronic model (i.e. CAD model) of an engineering object. The model datastore 220 may include working memory on the node 200.

In one embodiment, the local model datastore 220a contains local copies of CAD models managed by the global model datastore 220b. The local and global model datastores may coordinate together to provide data coherency between local copies of the CAD models and the global copy. In certain embodiments, the global model datastore is a redundant and/or a distributed storage system.

The change control module 230 controls user access to data managed by the model datastore 220. In one embodiment, the change control module 230 ensures that users can only access data that corresponds to parts, regions, geometries, elements and features that have been assigned to the user. All other users may be blocked by the change control module 230 from accessing data corresponding to the parts, regions, geometries, elements or features within the editing region that has been assigned to that user. In another embodiment, any user may change a feature as long as that feature or any unit of allocation that encompasses that feature has not been assigned to another user. The local change control module 230a may generate feature changes for the CAD model corresponding to editing sequences performed by the user, such as keyboard input, mouse movements, or the like. Generating feature changes from editing sequences facilitates change control for the features.

Examples of features include the shape, dimensions, composition, material properties and tolerances of an object, the mesh size and required accuracy for simulations, the path and tolerances for a manufacturing tool, and any other attribute or metric that may affect the performance of a product and the manufacture thereof.

The change control module 230 may also block an update to a CAD model if the changes to an editable feature violate engineering constraints associated with the modeled engineering object. For example, if changing the material of a particular component results in an increase in mass for the engineering object beyond a designated threshold, the change to the material may be blocked by the change control module 230. Constraints may be specified as limiting values, allowable values, equations, functions or the like.

The user-to-user communication module 240 facilitates direct communication between users. The user-to-user communication module 240 may leverage a variety of communication services such as those detailed above in the description of the computing and communications infrastructure 100. Communication may be between concurrent users as well as users that may not be actively editing an object. The interface elements provided by the user interface module 210 may enable a user to select particular users or groups as a target for a particular message or ongoing conversation.

The update module 250 propagates changes to editable features between nodes of the multi-user CAD system. The changes may be communicated via one or more communication channels 280 such as peer-to-peer communication channels, client-server communication channels, and data replication channels associated with a cloud computing environment. In the depicted embodiment, valid changes to a local copy of an engineering model are communicated by the client update module 250a to the server update module 250b within the server node 200b. In turn, the server update module 250b may update additional client nodes 200a.

One of skill in the art will appreciate that the granularity and frequency of updates may be a factor in how frequently a user may be blocked from editing a feature or geometry. For example, frequent updates of relatively small regions may enable multiple users to sequentially gain access to a common working region and thereby reduce the probability of blocking. In one embodiment, an editing region is released for access by any user when the changes to a feature or geometry are propagated to other nodes.

The version control module 260 provides revision control capabilities to the collaborative editing environment. For example, the version control module in conjunction with the user interface module may enable the concurrent users to select which revision of a product is to be updated with the edits. In certain embodiments, multiple revisions may be simultaneously edited. Revision control may also allow the collaborative users to discard edits associated with an editing session.

The partitioning module 270 partitions the engineering object into one or more editing regions. The partitioning may occur via spatial decomposition. The partitioning may be automatic, for example when an engineering object is opened for editing, or user driven, for example in response to a user selecting a region or particular elements or features for editing. In some embodiments, the partitioning module 270 partitions the design space and/or the engineering object into a plurality of editing regions by using a partitioning surface or a partition equation provided by the user.

Figure 6:
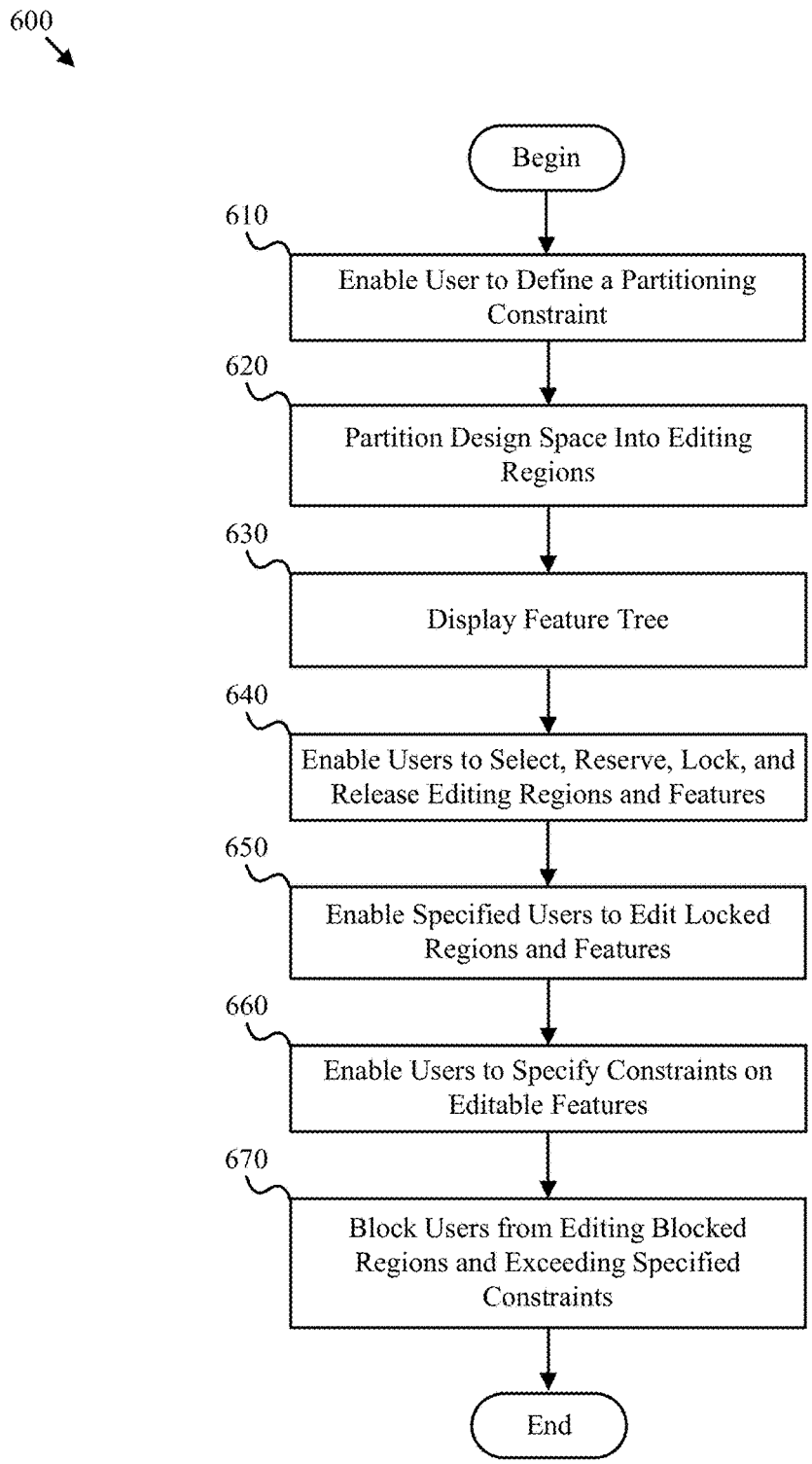
FIG. 6 is a flowchart diagram illustrating one example of a feature partitioning method that is consistent with one or more embodiments of the claimed invention.

In some embodiments, the local partitioning modules 270a initiate the partitioning process but the actual partitioning is performed by the global partitioning module 270b or a process under control of the global partitioning module 270b. A specific user-driven partitioning method is shown in FIG. 6 and described in the associated description.

Figure 3:
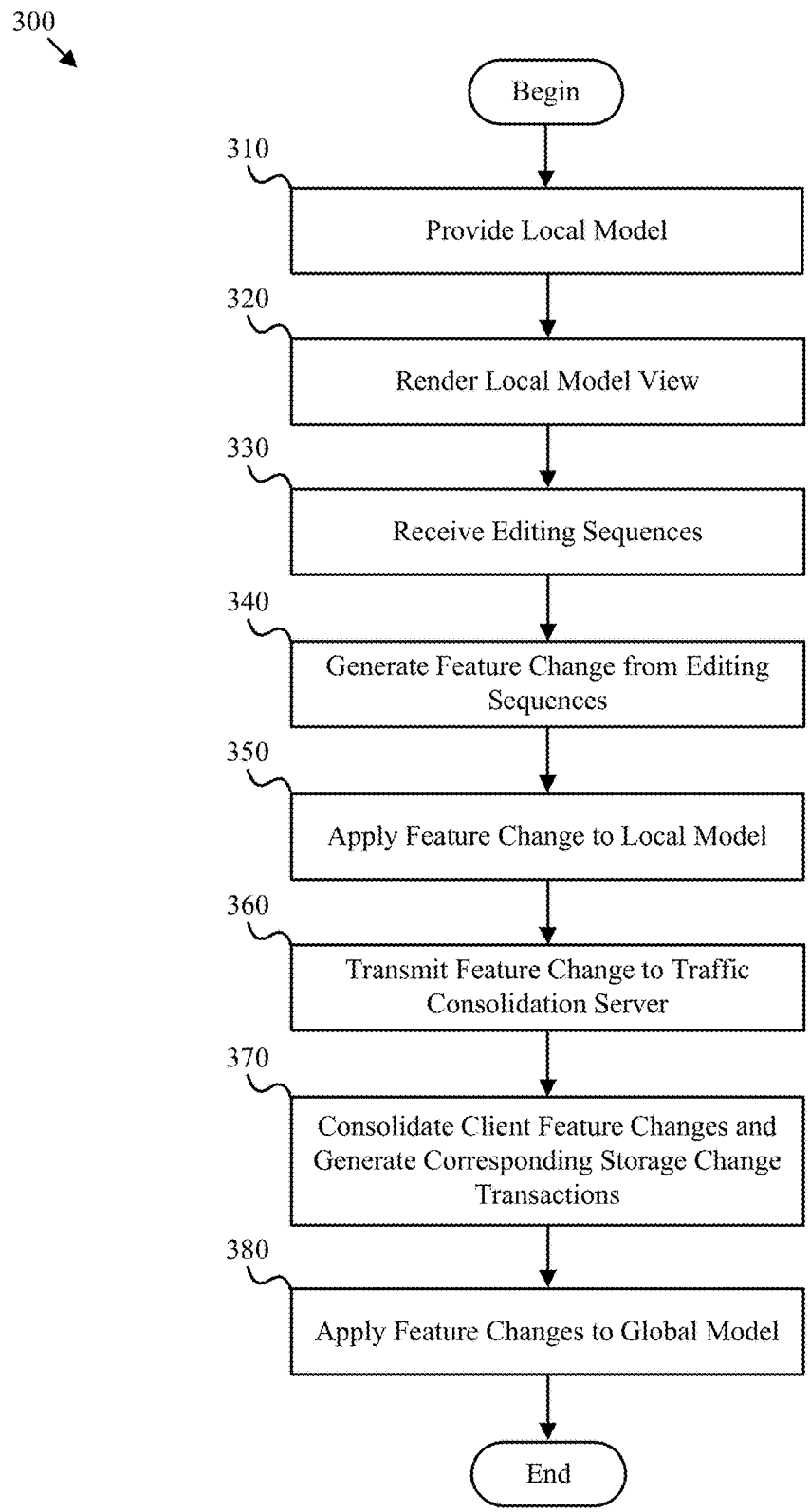
FIG. 3 is a flowchart diagram illustrating one embodiment of a multi-user CAD editing method of the claimed invention.

FIG. 3 is a flowchart diagram illustrating one embodiment of a multi-user CAD editing method 300 of the claimed invention. As depicted, the multi-user CAD editing method includes providing (310) a local model, rendering (320) a local view, receiving (330) editing sequences, generating (340) feature changes, applying (350) local feature changes, transmitting (360) the feature changes, consolidating (370) the feature change and applying (370) global feature changes.

Providing (310) a local model may include providing local copies of CAD models contained in a global model datastore. The local model may include data structures or files corresponding to an editing region within an engineering object in a global model datastore.

Rendering (320) a local view may include creating a graphical representation of CAD data in a local model datastore on a display for viewing by a user. The graphical rendering may be a 2D or 3D rendering from a variety of perspectives to facilitate editing. As the user views and edits features of the engineering object, rendering (320) a local view may include modifying the graphical representation to indicate portions of the engineering object selected for modification or changes to features of the engineering object made by the user.

Receiving (330) editing sequences may include receiving user input provided via a keyboard, mouse, or other input devices specifying changes to be made to features of an engineering object.

Generating (340) feature changes may include determining which features of an engineering object correspond to editing sequences received from the user and the nature and extent of changes to the editing features specified by the editing sequences. For example, an editing sequence altering the size of an engineering object may affect the mass of the object. In such an instance, generating (340) feature changes involves determining the changes to be made to size and mass features of the engineering object as specified by editing sequences received from the user.

Applying (350) local feature changes may include modifying a local copy of CAD data structures or files corresponding to an engineering object in a global model datastore. In one embodiment, applying (350) local feature changes may include saving copies of local CAD data before feature changes are applied, applying feature changes to the CAD data, and flagging the modified data as transactional until acknowledgement is received indicating local feature changes have been applied to the global model datastore. This embodiment facilitates system fault tolerance and enables the user to undo feature changes.

Transmitting (360) the feature changes may include communicating feature changes to a traffic consolidation server. The changes may be communicated via such communication channels as peer-to-peer communication channels, client-server communication channels, and data replication channels associated with a cloud computing environment. In one embodiment, feature changes are communicated to a traffic consolidation server assigned to consolidate feature changes pertaining to a specified region of an engineering object. In one embodiment, transmitting (360) feature changes may include transmitting feature changes to update the local model datastores of other users editing the same region of the engineering object. The feature changes may be transmitted from the client workstation where the feature change originated directly to other client workstations (as in a peer-to-peer network), or the feature changes may be transmitted to a traffic consolidation server which then forwards the feature changes to other client workstations editing the same region.

Consolidating (370) feature changes may include aggregating feature changes pertaining to a specified region of an engineering object on a traffic consolidation server assigned to the specified region. In one embodiment, users assigned to proximate editing regions are assigned to the traffic consolidation server assigned to consolidate feature changes pertaining to the proximate regions. Consolidating (370) feature changes may also include generating storage change transactions corresponding to the feature changes. In one embodiment, a CAD model server generates storage change transactions based on feature changes received from a traffic consolidation server.

Applying (370) global feature changes may include applying storage change transactions to a global model datastore. Applying (370) global feature changes may include executing commands to modify database records or modifying files on a storage device containing CAD data. In one embodiment, feature changes are applied by a CAD model server executing storage change transactions. In another embodiment, storage change transactions are transmitted and applied to CAD data in a storage array by a storage server.

Figure 4:
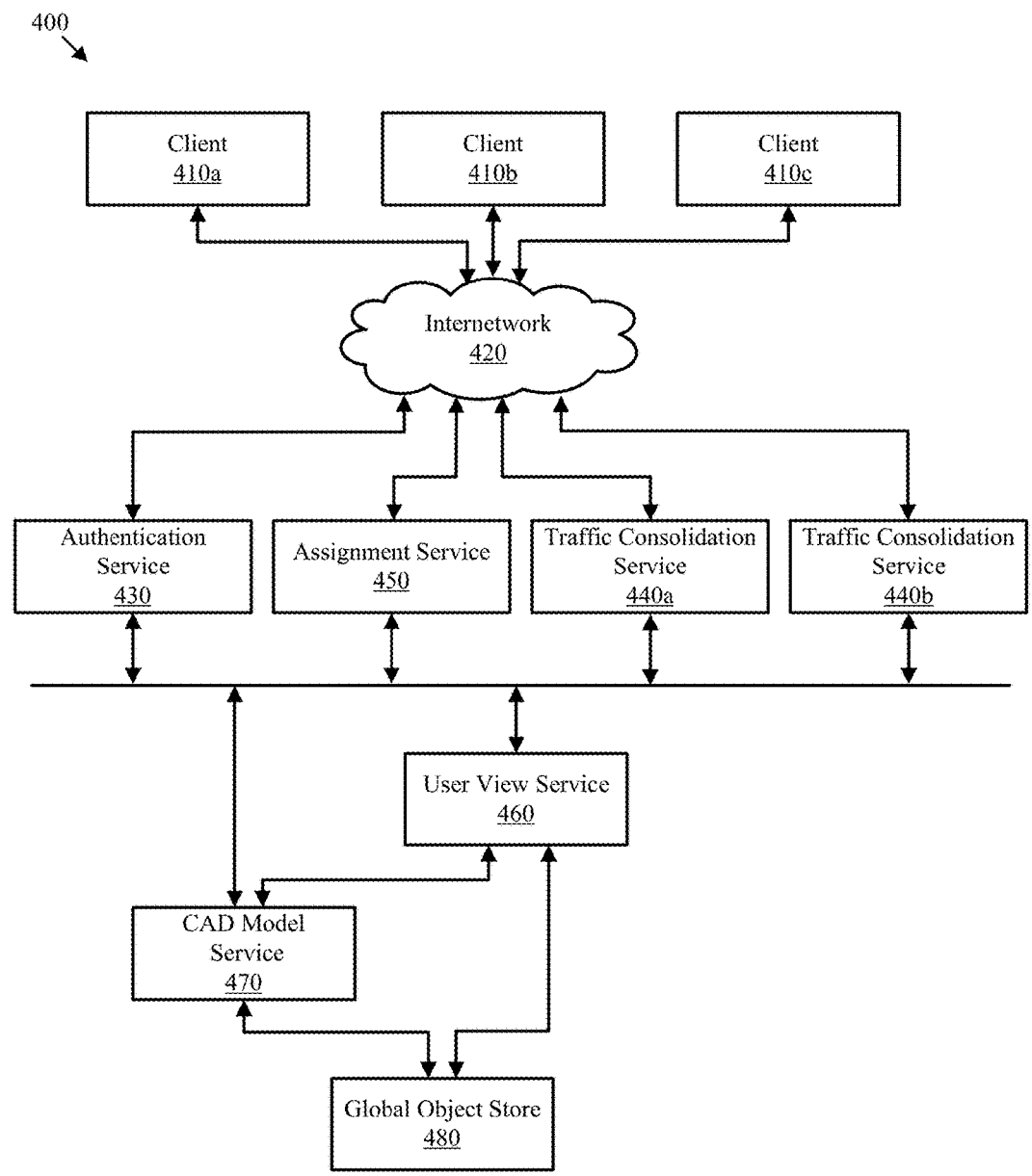
FIG. 4 is a block diagram providing a service-oriented depiction of one embodiment of a multi-user CAD system that is consistent with the claimed invention.

FIG. 4 is a block diagram providing a service-oriented depiction of one embodiment of a multi-user CAD system 400 that is consistent with the claimed invention. As depicted, the multi-user CAD system 400 includes a plurality of clients 410, an internetwork 420, an authentication service 430, a consolidation service 440, an assignment service 450, a user view service 460, a CAD model service 470, and a global object store 480. Each of the services may reside on a single computing device or be partitioned onto multiple devices. For example, the depicted embodiment includes consolidation services 440*a* and 440*b*, indicating that the consolidation service 440 has been partitioned onto multiple devices. Conversely, multiple services may reside on a single device. For example, it may be advantageous to locate both the authentication service 430 and assignment service 450 on a single server device.

The clients 410 receive user input and editing sequences to be made to an engineering object from users of the multi-user CAD system 400, convert those editing sequences to feature changes and transmit the feature changes over an internetwork 420. Before a user is permitted to edit an engineering object, the authentication service 430 may be required to authenticate the identity of the user. Clients 410 may also receive geometry definitions from the internetwork 420 and render them as a local object view of the engineering object or a portion thereof.

Once the user has been authenticated, feature changes made by users on one or more clients 410 are transmitted to the traffic consolidation service 440. The traffic consolidation service 440 consolidates the feature changes for transmission to the CAD model service 470. The traffic consolidation service 440 may also transmit geometry definitions corresponding to an editing region of the engineering object to one or more clients 410 viewing the editing region. As depicted, the traffic consolidation service 440 may be partitioned among several physical server devices. As the number of clients 410 increases, additional servers managing the traffic consolidation service 440 may be desirable to provide more timely communication of editing changes and geometry definitions.

In some embodiments, clients 410 that are assigned to proximate editing regions are assigned to the same traffic consolidation service 440 and feature changes made by each client 410 are broadcast to each of the other clients 410 assigned to the traffic consolidation service 440 previous to changing the features in the global CAD model managed by CAD model service 470. By assigning clients based on editing proximity and locally broadcasting feature changes, networking communications and communications latencies associated with feature updates may be reduced.

The assignment service 450 assigns clients 410 to servers comprising the traffic consolidation service 440. The assignment service 450 may assign clients 410 editing proximate regions of the engineering object to the same server in the traffic consolidation service 440. As additional clients 410 are added to the multi-user CAD system 400 and as users select different regions of the engineering object to edit, the assignment service 450 may alter the assignment of clients 410 and thereby balance the processing and communication loads of the system.

Certain embodiments of the system 400 include the user view service 460, which determines the geometries corresponding to areas of the engineering object that are being viewed and edited by the clients 410. The user view service may retrieve and/or generate geometry definitions for rendering by the clients 410, and transmit the geometry definitions to specific traffic consolidation services 440 for forwarding to the clients 410.

The CAD model service 470 controls access to CAD data managed by the global object store 480. To control access to the CAD data, the CAD model service 470 may partition the engineering object into editing regions. The partitioning may be automatic or defined by input from one or more users. The CAD model service 470 may then ensure that users can only access regions or features assigned to that user. The CAD model service 470 may also enforce engineering constraints by blocking changes to an editable feature that violate specified constraints associated with features of the modeled engineering object.

Figure 5:
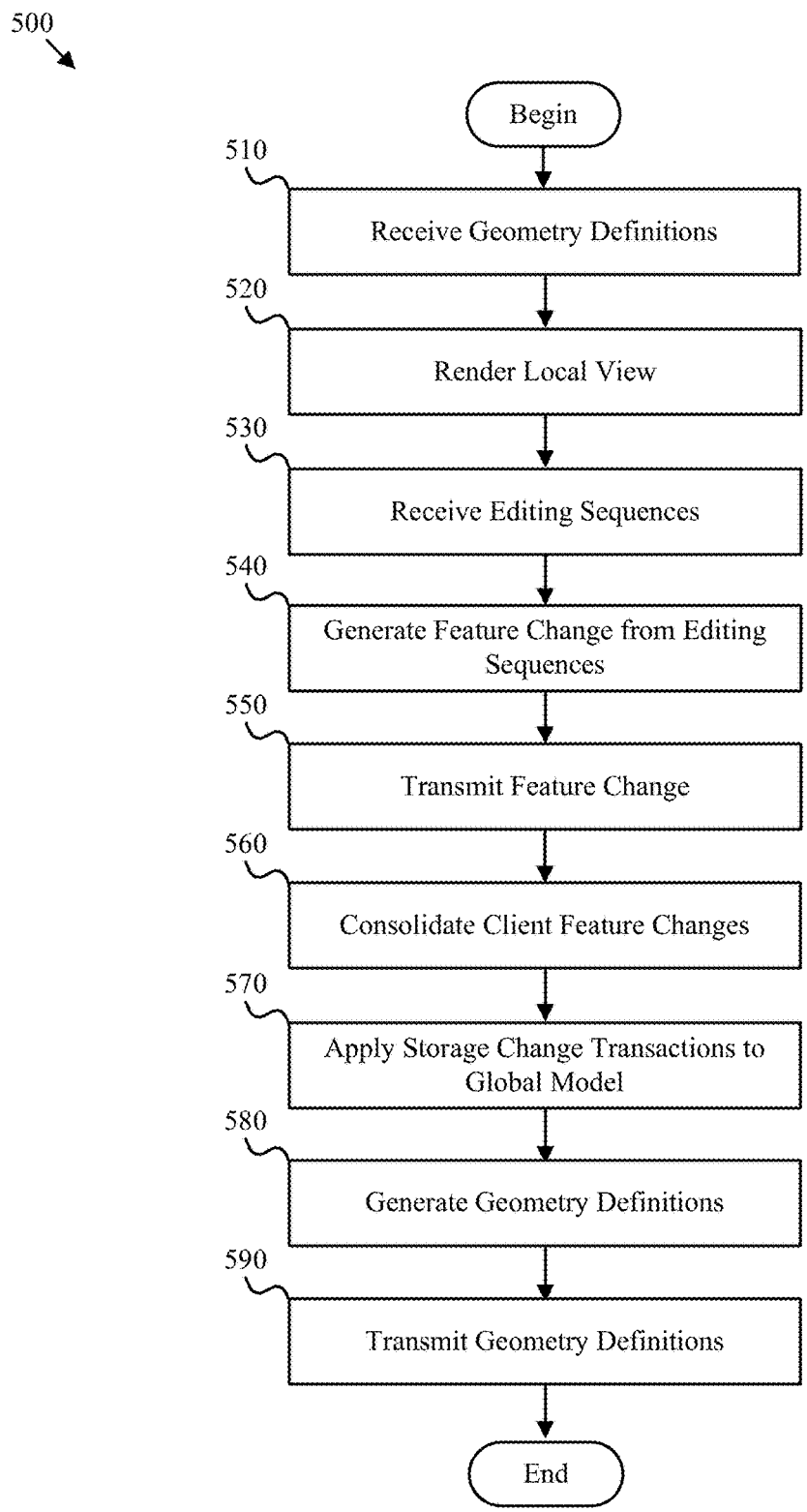
FIG. 5 is a flowchart diagram illustrating one embodiment of a multi-user geometry editing method of the claimed invention.

FIG. 5 is a flowchart diagram illustrating one embodiment of a multi-user geometry editing method 500 of the claimed invention. As depicted, the multi-user geometry editing method includes receiving (510) one or more geometry definitions, rendering (520) a local view, receiving (530) editing sequences, generating (540) feature changes, transmitting (550) the feature changes, consolidating (560) the feature changes, applying (570) storage change transactions, generating (580) geometry definitions and transmitting (590) the geometry definitions. The multi-user geometry editing method 500 facilitates the use of generic client workstations to edit CAD object models in a cloud computing environment or the like. Client workstations may not require local copies of CAD data structures or specialized CAD applications, instead focusing on rendering geometries as local views of regions of an engineering object. User-oriented functions such as view rendering and receiving user input are separated from storage, access management, and load balancing functions, which then may be abstracted and distributed over a variety of server architectures.

Receiving (510) one or more geometry definitions may include receiving geometry definitions corresponding to a local view of a region of an engineering object. In one embodiment a client workstation receives geometry definitions from a traffic consolidation server assigned to the editing region of the engineering object corresponding to the local view.

Rendering (520) a local view may include creating a graphical representation of a region of the engineering object based on the geometry definitions received. As the user views and edits features of the engineering object, rendering (520) a local view may include modifying the graphical representation to indicate portions of the engineering object selected for modification or changes to features of the engineering object made by the user.

Receiving (530) editing sequences may include receiving user input provided via a keyboard, mouse, or other input devices specifying changes to be made to features of an engineering object.

Generating (540) feature changes may include determining which features of an engineering object correspond to editing sequences received from the user and the nature and extent of changes to the editing features specified by the editing sequences. For example, an editing sequence altering the size of an engineering object may affect the mass of the object. In such cases, generating (540) feature changes involves determining the changes to be made to size and mass features of the engineering object as specified by editing sequences received from the user. In one embodiment, generating (540) feature changes may be performed by an application installed on a client workstation. In another embodiment, generating (540) feature changes may be performed by an application running in a web browser.

Transmitting (550) the feature changes may include communicating feature changes to a traffic consolidation server. The changes may be communicated via such communication channels as peer-to-peer communication channels, client-server communication channels, virtual private networks, and data replication channels associated with a cloud computing environment. In one embodiment, feature changes are communicated to a traffic consolidation server via the internet.

Consolidating (560) the feature changes may include aggregating feature changes pertaining to a specified region of an engineering object on a traffic consolidation server assigned to the specified region. In one embodiment, users assigned to proximate editing regions are assigned to the traffic consolidation server assigned to consolidate feature changes pertaining to the proximate regions. Consolidating (560) feature changes may also include generating storage change transactions corresponding to the feature changes. In one embodiment, a CAD model service generates storage change transactions based on feature changes received from a traffic consolidation server.

Applying (570) storage change transactions may include applying storage change transactions to a global model datastore. Applying (570) global feature changes may include executing commands to modify database records or modifying files on a storage device containing CAD data. In one embodiment, feature changes are applied by a CAD model server executing storage change transactions. In another embodiment, storage change transactions are transmitted and applied to CAD data in a storage array by a storage server.

Generating (580) geometry definitions may include determining geometries required to render a local view of an editing region of an engineering object. In one embodiment, generating (580) geometry definitions is performed by a CAD model server. In another embodiment geometry definitions pertaining to an editing region of an engineering object are retrieved from a datastore.

The CAD model server may then transmit (590) the geometry definitions to a traffic consolidation server. In one embodiment, a CAD model server is assigned to generate geometry definitions pertaining to a specified region of an engineering object. The CAD model server then transmits the geometry definitions to a traffic consolidation server assigned to transmit the geometry definitions to client workstations editing one or more regions corresponding to the geometry definitions.

FIGS. 6-10 focus on specific aspects of, and interfaces for, the multi-user CAD editing method 300 and multi-user geometry editing method 500. Large collaborative CAD projects require coordination and control of the activities of potentially hundreds to thousands of engineers and designers. Such projects have been managed by such means as deconstructing the engineering object into components and subcomponents that are designed, engineered, and manufactured independently, leading to component incompatibilities; by partitioning the subassembly design process in phases over time, leading to longer development times; or by attempting to manage synchronous design processes by rule and policy, leading to corruption of the CAD database or lost work when multiple users mistakenly edit features concurrently. Aspects of the multi-user CAD editing method 300 and multi-user geometry editing method 500 described in detail in FIGS. 6-10 address the needs of multi-user collaborative CAD.

FIG. 6 is a flowchart diagram illustrating one example of a feature partitioning method 600 that is consistent with one or more embodiments of the claimed invention. As depicted, the feature partitioning method 600 includes enabling 610 a user to define a partitioning constraint, partitioning 620 a design space into editing regions, displaying 630 a feature tree, enabling 640 users to select, reserve, lock and release editing regions and features, enabling 650 specified users to edit locked regions and features, enabling 660 users to specify constraints on editable features and blocking 670 users from editing locked regions and exceeding specified constraints.

Enabling 610 a user to define a partitioning constraint may include enabling the user to specify an equation, a geometry list, a feature selection filter, a partitioning surface that can guide the partitioning process. For example, a feature selection filter may specify specific constraints such as "find solid geometries with a fillet".

A partition surface may be specified via conventional CAD input methods such as entering control points, specifying parameters for a geometry or specifying a tool path and associated tool. The partitioning surface may correspond to a variety of shapes or geometries. For example, the partitioning surface may be a planar surface, a curved surface, an open surface, a closed surface, or the surface of a three dimensional shape (in part or whole) such as a block, a cylinder, a cone, a conical frustum and an ellipsoid.

Partitioning 620 a design space into editing regions may include sorting and/or cutting an engineering object and/or geometries and features associated therewith into features, parts or regions that meet the specified constraints. The partitioned features, parts or regions may then be independently reserved and assigned to one or more users.

Displaying 630 a feature tree may include displaying various geometries and elements used to define the engineering object and various attributes associated therewith such as the shape, dimensions, composition, material properties and tolerances of the geometry.

Enabling 640 users to select, reserve, lock and release editing regions and features may include providing interface elements that facilitate selecting, reserving, locking (i.e. assigning) and releasing editing regions. In one embodiment, enabling 650 specified users to edit locked regions and features includes allowing only users that have locked (i.e. been assigned to) a region or particular feature to edit (features within) that region or that particular feature. In another embodiment, any user may edit features within a region or a specific feature as long as that region or feature has not been assigned to another user.

Enabling 660 users to specify constraints on editable features may include displaying edit controls that enable a user to enter constraint equations or limiting values on features. The edit controls may be separate from, or integrated with, the feature tree. Blocking 670 users from editing locked regions and/or features and exceeding specified constraints may include enforcing locks on regions and features and constraints on features.

Figure 7:
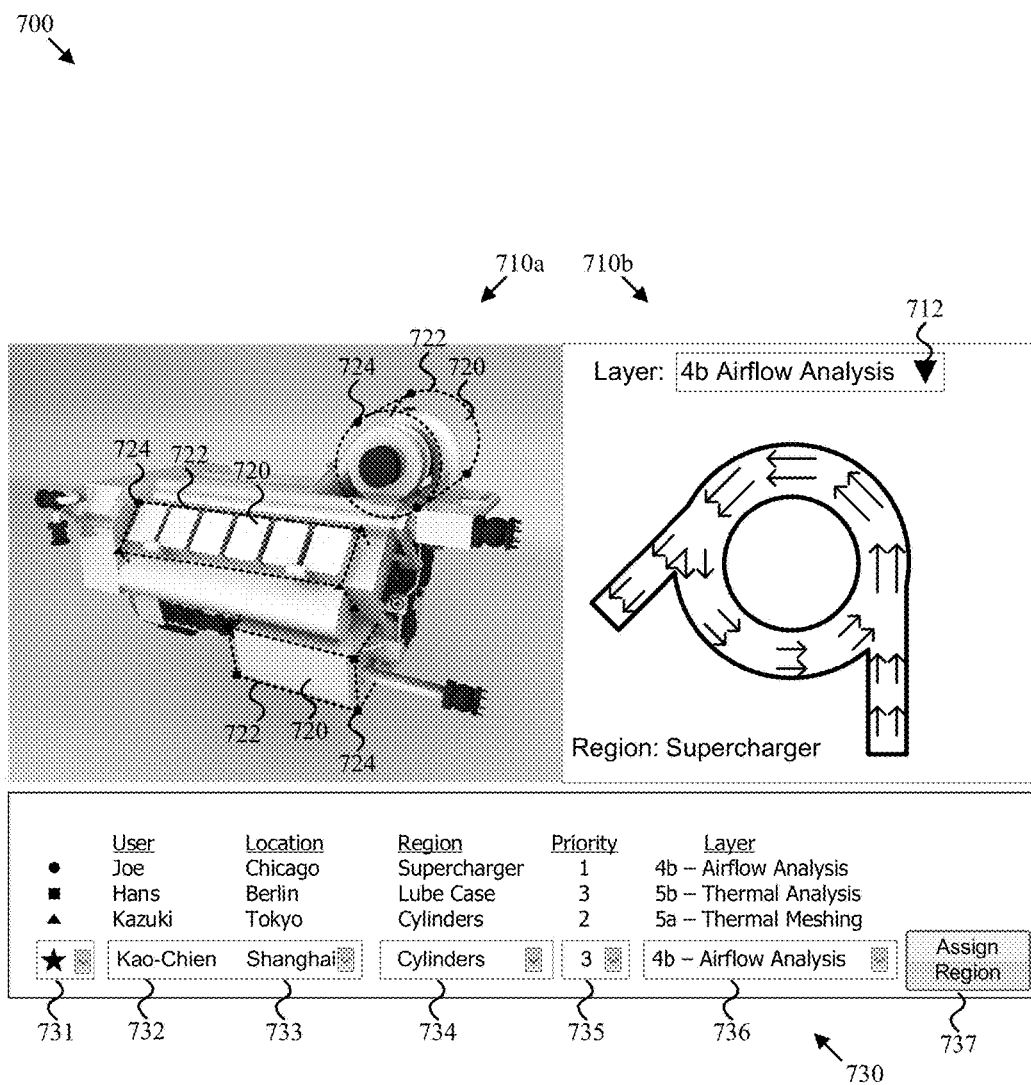
FIG. 7 is a graphical and textual depiction of one example of a geometry assignment user interface that is consistent with embodiments of the claimed invention.

FIG. 7 is a graphical and textual depiction of one example of a geometry assignment user interface 700 that is consistent with embodiments of the claimed invention. As depicted, the geometry assignment user interface 700 includes a graphical rendering 710 with design space display regions 720 and region assignment tools 730. The geometry assignment user interface 700 facilitates assignment of defined editing regions to users for collaborative editing of electronic models of engineering objects.

The graphical rendering 710 provides a graphical rendering of an engineering object and/or layer associated therewith. In the depicted embodiment, the graphical rendering includes a perspective CAD rendering 710a and a cross-sectional analysis rendering 710b.

The editing regions 720 may be demarcated with boundaries 722 and marked with user identifiers 724 that indicate generally the extents of the region and which user the region has been assigned to. Although the depicted extents do not overlap each other, the spatial decomposition process may result in distinct regions whose extents do overlap. An editing region may also be spatially disjoint. In some embodiments, graphical renderings within each region are color coded or coded in some other way such as a shading pattern to indicate which user they are assigned to.

In the depicted embodiment, a layer selector 712 (e.g. a drop-down list) enables a collaborative user to select the layer that is to be edited or viewed for an assigned editing region. Software tools that are specific to the selected layer (not shown) may be made available or activated on the user interface 700 in response to layer selection. Examples of such software tools include visualization tools, design tools, analysis tools, and manufacture planning tools.

The region assignment tools 730 may provide a variety of information relative to collaborative editing such as user identifiers 731, user names 732 and locations 733, a region name 734, a user priority 735, and a layer indicator 736. The user names 731 may correspond to a particular user identifier 724. The location 733 may indicate the physical location of the user and thereby enhance coordination and communication. As depicted, each of the region assignment tools 730 may have associated assignment controls, such as drop-down lists, to facilitate user selection, user assignment to editing regions, and setting of related parameters, such as the user identifier 724 and user priority 735. When a user, editing region, and related parameters have been selected, assignment may be completed by activating a control such as the assign region button 737.

The region name 734 may be derived from information within the electronic model or specified by a user upon assignment or selection. The user priority 735 may be used to determine which user a region should be assigned to if multiple users attempt to edit the same region. In one embodiment, a higher priority user can assume control of an editing region assigned to a lower priority user. The layer indicator 736 may indicate the layer in which the user is currently assigning users to editing regions.

Figure 8:
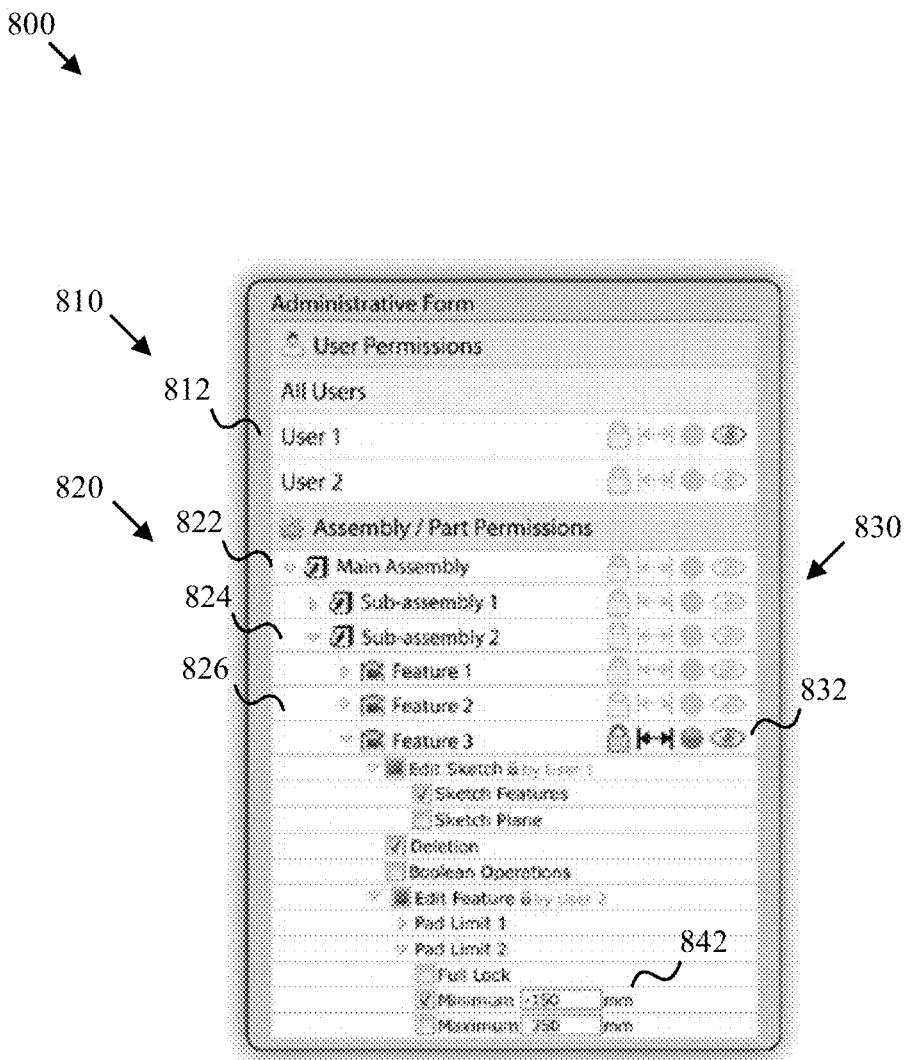
FIG. 8 is a graphical and textual depiction of one example of a feature assignment user interface that is consistent with one or more embodiments of the claimed invention.

FIG. 8 is a graphical and textual depiction of one example of a feature assignment user interface 800 that is consistent with one or more embodiments of the claimed invention. As depicted, the feature assignment user interface 800 includes a user list 810, an editing region feature list 820, a feature status display 830, and a feature editing region 840. The feature assignment user interface 800 facilitates controlling collaborative user access and editing of features associated with editing regions in a design space for electronic models of engineering objects.

The user list 810 may include user interface controls for identifying and selecting users to be assigned access to features associated with editing regions. Controls for displaying the user list 810 may include scrolling lists, drop-down lists, tree view controls, hierarchical outlines, or the like.

The editing region feature list 820 may include user interface controls for inspecting and selecting editing regions in a design space to facilitate assignment of users to editable features associated with a selected editing region. In the depicted embodiment, the editing region feature list may comprise an expanding hierarchical outline with a main assembly list 822, a subassembly list 824, and a feature list 826. Relationships between main assemblies, subassemblies, and related features are represented by levels in the expanding hierarchy. Other embodiments may include drop-down lists, tree view controls, or the like.

The feature status display 830 may include icons or other representations, such as text identifiers, indicating the status of editing regions and associated features. Status representations may indicate user access to editing regions or features, the identity of users currently assigned access or currently modifying editing regions or features, user permission to browse editing regions to which the user has not been assigned, or the like. The depicted embodiment includes status icons 832, indicating locking, selection, and access status.

The feature editing region 840 facilitates editing of features associated with editing regions, and may include a wide range of editing tools and controls, depending on the nature of the feature data. As depicted, controls may be as simple as checkboxes and text fields. Other controls may include radio buttons, scrolling lists, drop-down lists, combo boxes, sliders, spinners, or the like. In other embodiments, the feature editing region may invoke graphical editing tools for graphically editing an editable feature, or text editing tools for creating and editing design notes associated with an editing region.

Figure 9:
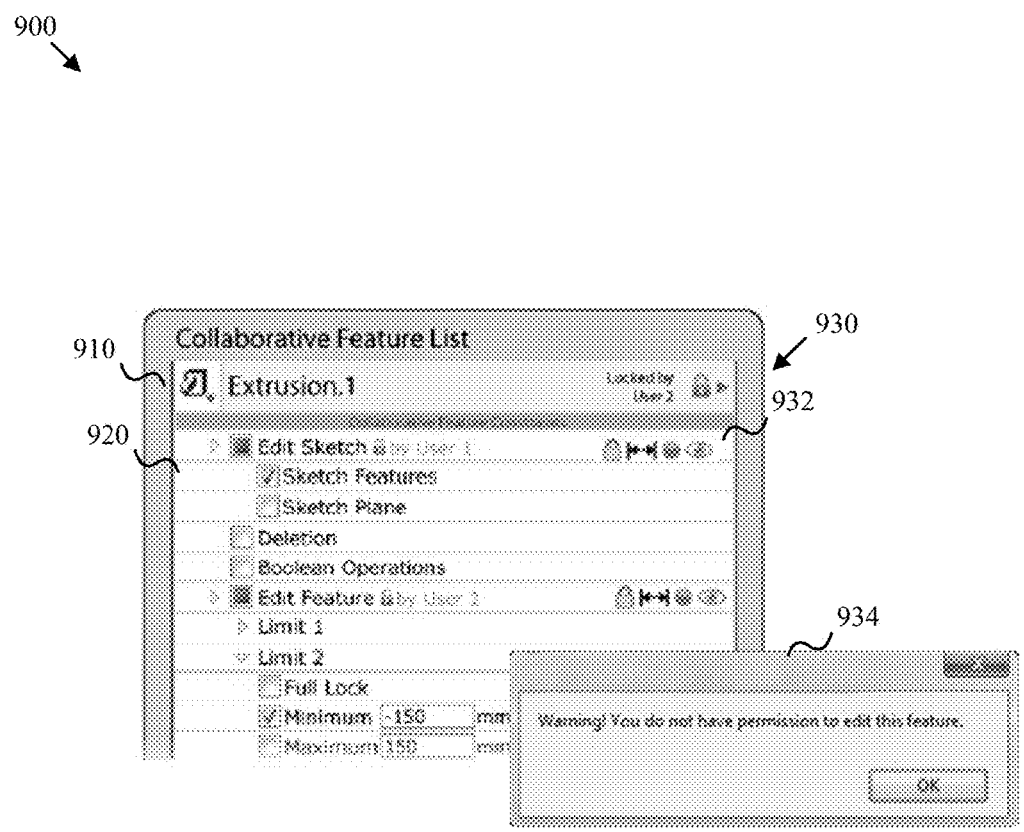
FIG. 9 is a graphical and textual depiction of one example of a collaborative feature constraint user interface that is consistent with embodiments of the claimed invention.

FIG. 9 is a graphical and textual depiction of one example of a feature constraint user interface 900 that is consistent with embodiments of the claimed invention. As depicted, the feature constraint user interface 900 includes a feature tree 910, a feature constraint editor 920, and a feature status display 930. The feature constraint user interface 900 facilitates specification of constraints on editable features for collaborative user editing of electronic models of engineering objects, and may be used in conjunction with the feature partitioning method 600.

The feature tree 910 may include user interface controls for inspecting and selecting editable features associated with an editing region. As depicted, the feature tree may comprise a pop-up list for selecting an editing region. Other embodiments may include drop-down lists, tree view controls, or the like.

The feature constraint editor 920 provides user interface controls for assigning and modifying constraints on an editable feature. As depicted, the feature constraint editor may comprise controls such as checkboxes and text fields. Other controls may be used as appropriate for the feature's data type, for example, radio buttons, scrolling lists, drop-down lists, combo boxes, or the like. In other embodiments, the feature constraint editor may invoke graphical editing tools for graphically specifying constraints on an editable feature.

The feature status display 930 may include icons or other representations, such as text identifiers, indicating the status of features. Status representations may indicate user access to editable features, the identity of users currently assigned access or currently modifying editable features, user permission to browse features to which the user has not been assigned, or the like. The depicted embodiment includes status icons 932 indicating locking, selection, and access status, and a warning dialog 934, indicating that the user has attempted to edit a feature not assigned to the user.

Figure 10:
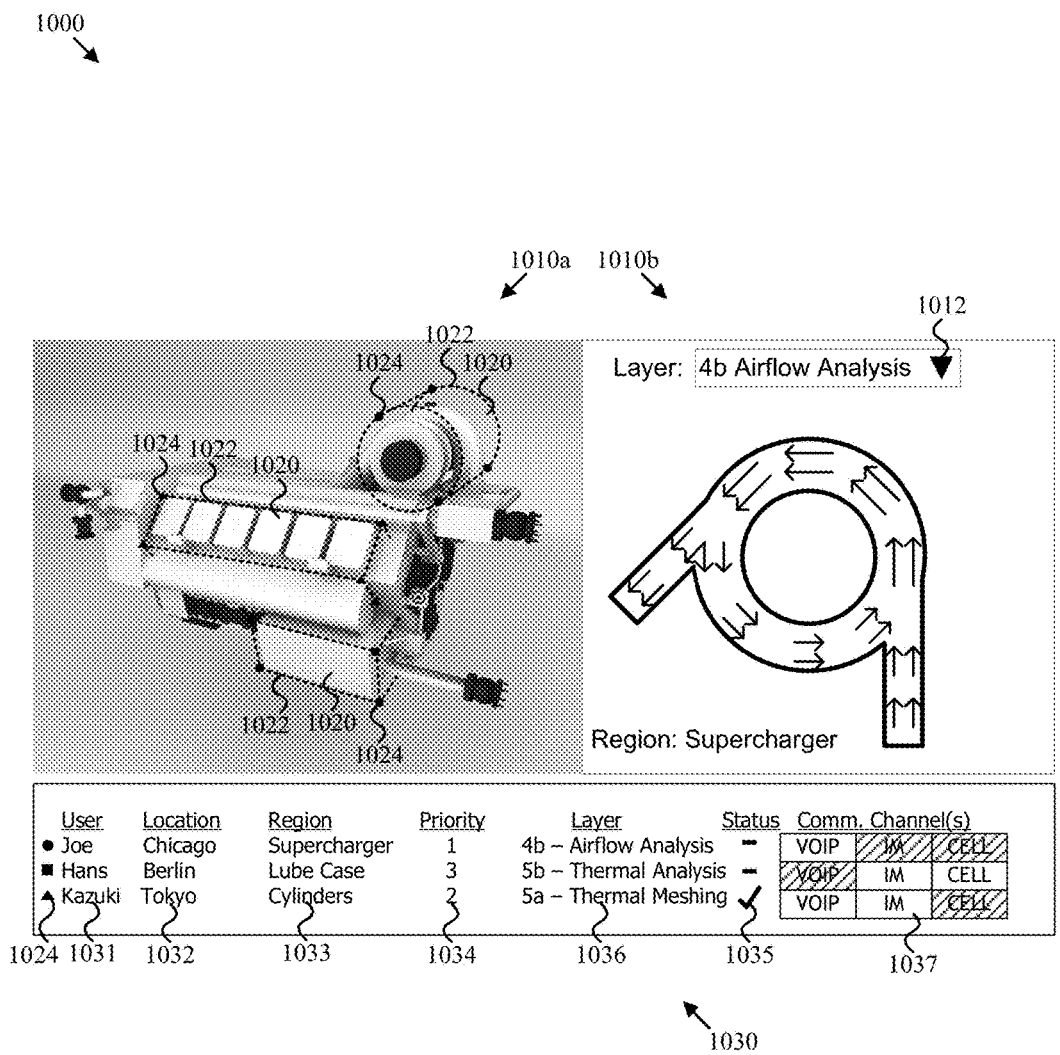
FIG. 10 is a graphical and textual depiction of one example of a multi-user CAD user interface that is consistent with one or more embodiments of the claimed invention.

FIG. 10 is a graphical and textual depiction of one example of a multi-user CAD user interface 1000 that is consistent with one or more embodiments of the claimed invention. As depicted, the user interface 1000 includes a graphical rendering 1010 with editing regions 1020 and a concurrent user list 1030. The user interface 1000 facilitates collaborative user editing of electronic models of engineering objects.

The graphical rendering 1010 provides a graphical rendering of an engineering object and/or layer associated therewith. The graphical rendering may be a 2D or 3D rendering from a variety of perspectives that facilitates editing. In the depicted embodiment, the graphical rendering includes a perspective CAD rendering 1010*a* and a cross-sectional analysis rendering 1010*b* for a region assigned to the user of the interface 1000 (i.e. 'Joe').

The editing regions 1020 may be demarcated with boundaries 1022 and marked with user identifiers 1024 that indicate generally the extents of the region and which user the region has been assigned to. Although the depicted extents do not overlap each other, the spatial decomposition process may result in distinct regions whose extents do overlap. For example, an electronic model for an airplane may be partitioned into a cabin interior region, a fuselage exterior region, and a region for the aircraft wings. In some embodiments, graphical renderings within each region are color coded or coded in some other way such as a shading pattern to indicate which user they are assigned to. In certain embodiments, an editing region may also be spatially disjoint.

In the depicted embodiment, a layer selector 1012 (e.g. a drop-down list) enables a collaborative user to select the layer that is to be edited or viewed for an assigned editing region. Software tools that are specific to the selected layer (not shown) may be made available or activated on the user interface 1000 in response to layer selection. Examples of such software tools include visualization tools, design tools, meshing tools, simulation tools, analysis tools, manufacture planning tools, and manufacture simulation tools.

The concurrent user list 1030 may provide a variety of information relative to collaborative editing such as user names 1031 and locations 1032, a region name 1033, a user priority 1034, a region status 1035, a layer indicator 1036, and a channel indicator/selector 1037. The user names 1031 may correspond to a particular user identifier 1024. The location 1032 may indicate the physical location of the user and thereby enhance coordination and communication.

The region name 1033 may be derived from information within the electronic model or specified by a user upon assignment or selection. The user priority 1034 may be used to determine which user a region should be assigned to if multiple users attempt to edit the same region. In one embodiment, a higher priority user can assume control of an editing region assigned to a lower priority user. The region status 1035 may indicate the status of editing or analysis for the region such as a 'pending' or 'completed'. The layer indicator 1036 may indicate the layer that the user is currently editing. The channel indicator/selector 1037 may provide a visual indication of which communication channels are available for communication with each user and enable selection of particular channels for use in communicating with one or more users.

The various elements of the multi-user CAD user interface 1300 function cooperatively to facilitate productive multi-user CAD. The preceding depiction of the multi-user CAD user interface and other inventive elements described herein are intended to be illustrative rather than definitive. Similarly, the claimed invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for scalable multi-user CAD, the system comprising:
a plurality of CAD workstations, each CAD workstation thereof configured to render geometry definitions that correspond to a viewed portion of a global CAD model, receive editing sequences from a user, generate feature changes from the editing sequences corresponding to the viewed portion of the global CAD model, and subsequently transmit the feature changes to a traffic consolidation server assigned to the CAD workstation;
a plurality of traffic consolidation servers, each traffic consolidation server thereof configured to receive and consolidate a plurality of feature changes from at least one CAD workstation to provide consolidated feature changes and transmit the consolidated feature changes to a CAD model server;
the CAD model server configured to receive the consolidated feature changes, update the global CAD model, and convert at least a portion of the global CAD model to geometry definitions; and
the CAD model server further configured to transmit the geometry definitions to a selected traffic consolidation server wherein the geometry definitions correspond to a viewed portion of the global CAD model for at least one CAD workstation assigned to the selected traffic consolidation server.

2. The system of claim 1, wherein the CAD model server is further configured to generate a plurality of storage change transactions corresponding to the feature changes and provide the storage change transactions to a storage server.

3. The system of claim 2, further comprising a storage server configured to store data corresponding to a global CAD model, receive the storage change transactions, and change the data corresponding to the global CAD model.

4. The system of claim 3, wherein the storage server is a database server and wherein the storage change transactions are database transactions.

5. The system of claim 1, further comprising an assignment server configured to monitor a processing load on each of the plurality of traffic servers.

6. The system of claim 1, wherein the assignment server is further configured to reassign a CAD workstation to a different traffic consolidation server and thereby reduce a processing load imbalance for the plurality of traffic consolidation servers.

* * * * *